US 12,480,013 B2

(12) United States Patent
Fukushiro et al.

(10) Patent No.: US 12,480,013 B2
(45) Date of Patent: Nov. 25, 2025

(54) PIGMENT COMPOSITIONS, TABLETS AND CAPSULES

(71) Applicant: TOPPAN INC., Tokyo (JP)

(72) Inventors: Masato Fukushiro, Tokyo (JP); Masatoshi Saito, Tokyo (JP)

(73) Assignee: TOPPAN INC., Tokyo (JP)

( * ) Notice: Subject to any disclaimer, the term of this patent is extended or adjusted under 35 U.S.C. 154(b) by 739 days.

(21) Appl. No.: 17/715,221

(22) Filed: Apr. 7, 2022

(65) Prior Publication Data

US 2022/0228013 A1  Jul. 21, 2022

Related U.S. Application Data

(63) Continuation of application No. PCT/JP2020/039360, filed on Oct. 20, 2020.

(30) Foreign Application Priority Data

Oct. 21, 2019 (JP) .................. 2019-192282

(51) Int. Cl.
*C09D 11/322* (2014.01)
*C09D 11/033* (2014.01)
*C09D 11/037* (2014.01)
*C09D 11/38* (2014.01)

(52) U.S. Cl.
CPC .......... *C09D 11/322* (2013.01); *C09D 11/033* (2013.01); *C09D 11/037* (2013.01); *C09D 11/38* (2013.01)

(58) Field of Classification Search
CPC ... C09D 11/322; C09D 11/033; C09D 11/037; C09D 11/38; C09D 11/14; C09D 17/00; C09D 17/007; C09D 17/001; B41J 2/01; B41M 5/00
See application file for complete search history.

(56) References Cited

U.S. PATENT DOCUMENTS

2019/0211221 A1* 7/2019 Hongo ................. C09D 11/328

FOREIGN PATENT DOCUMENTS

| JP | 2006-169301 A | 6/2006 |
|---|---|---|
| WO | WO-2018/116645 A1 | 6/2018 |
| WO | WO-2019/065512 A1 | 4/2019 |
| WO | WO 2019/142495 A | 7/2019 |

OTHER PUBLICATIONS

WO2019142495A1 Machine Translation (Year: 2019).*
Extended European Search Report issued in corresponding European Patent Application No. 20878252.4, dated Dec. 22, 2022.
International Searching Authority, "International Search Report," issued in connection with International Patent Application No. PCT/JP2020/039360, dated Dec. 28, 2020, 7 pages.
International Searching Authority, "Written Opinion," issued in connection with International Patent Application No. PCT/JP2020/039360, Dec. 28, 2020, 3 pages.

* cited by examiner

*Primary Examiner* — Robert A Wax
*Assistant Examiner* — Quanglong N Truong
(74) *Attorney, Agent, or Firm* — Foley & Lardner LLP (57) ABSTRACT

A pigment composition for a pigment contained in ink or the like is provided, the pigment composition being capable of better preventing oxidation of the pigment from occurring in the ink or after printing, and better reducing discoloration of the pigment, even when the pigment has a small particle size such as a nanometer size. Further, a tablet and a capsule are provided. For example, the pigment composition includes: a black iron oxide; a dispersion medium; a dispersant; and an oxidation inhibitor, wherein the black iron oxide has a median diameter D50 of 30 nm or greater and 1 μm or less, and the oxidation inhibitor is reduced isomaltulose.

8 Claims, 2 Drawing Sheets

PIGMENT COMPOSITIONS, TABLETS AND CAPSULES

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/039360, filed on Oct. 20, 2020, which is based upon and claims the benefit of priority to Japanese Patent Application No. 2019-192282, filed on Oct. 21, 2019; the disclosures of which are incorporated herein by reference in their entireties.

TECHNICAL FIELD

The present invention relates to pigment compositions, tablets and capsules.

BACKGROUND

Techniques related to inkjet printing ink (hereinafter, also referred to as an "IJ ink") are described, for example, in PTL 1.
[Citation List] [Patent Literature] PTL 1: JP 2006-169301 A

SUMMARY OF THE INVENTION

Technical Problem

For example, there are IJ inks containing water-based pigment. IJ inks containing water-based pigment may contain black iron oxide as a pigment.

In development of IJ inks containing water-based pigment, the particle size of the pigment may be reduced (for example, to a nanometer size) in order to improve inkjet suitability. However, inks having a pigment with small particle size may have a problem in that the pigment becomes oxidized in the ink and after printing, which causes discoloration of the ink.

The present invention has been made in view of the above circumstances, and provides a pigment composition for a pigment contained in ink or the like, the pigment composition being capable of better preventing oxidation of the pigment from occurring in the ink or after printing, and better reducing discoloration of the pigment, even when the pigment has a small particle size such as a nanometer size. The present invention further provides a tablet and a capsule.

Solution to Problem

A pigment composition according to an aspect of the present invention includes: a black iron oxide; a dispersion medium; a dispersant; and an oxidation inhibitor, wherein the black iron oxide has a median diameter D50 of 30 nm or greater and 1 µm or less, the dispersion medium contains water, and the oxidation inhibitor is reduced isomaltulose.

Advantageous Effects of the Invention

According to an aspect of the present invention, even when a pigment contained in ink or the like has a small particle size such as a nanometer size, it is possible to better prevent oxidation of the pigment from occurring in the ink and after printing, and reduce discoloration of the pigment.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

A pigment composition according to an embodiment of the present invention can be used for, for example, IJ ink for use in printing of characters, images, or the like on a surface of a pharmaceutical tablet by inkjet printing. The following description specifically explains configurations of a pigment composition according to an embodiment of the present invention, a tablet and a capsule, which have a print portion printed with the IJ ink using the pigment composition.

Hereinafter, a pigment composition used for inkjet ink in a concentrated state is also referred to as a "water-based pigment inkjet dispersion liquid." The IJ ink according to an embodiment of the present invention contains the pigment composition of 10 mass % or greater and 80 mass % or less of a total mass of the IJ ink, more preferably 30 mass % or greater and 60 mass % or less, and still more preferably 40 mass % or greater and 50 mass % or less. When the content of the pigment composition is less than 10 mass %, the ink has decreased color development properties, and when the content of the pigment composition is greater than 80 mass %, the ink has increased viscosity, which may hinder uniform ejection of the ink.

[Configuration of Pigment Composition]

The pigment composition according to the present embodiment at least contains a black iron oxide, a dispersion medium, a dispersant, and an oxidation inhibitor. The black iron oxide according to the present embodiment has a median diameter D50 of 30 nm or greater and 1 μm or less. The dispersion medium according to the present embodiment contains water. The oxidation inhibitor according to the present embodiment is reduced isomaltulose.

With this configuration, even when the pigment contained in ink or the like has a small particle size, it is possible to better prevent oxidation of the pigment from occurring in the ink or after printing, and reduce discoloration of the pigment. Each component will be further described below.

(Black Iron Oxide)

Examples of the black iron oxide used in the present embodiment include FeO, $Fe_2O_3$, and $Fe_3O_4$. These pigments may be used singly or in combination of two or more as necessary.

The dispersion average particle size (average primary particle size) of the black iron oxide applied to the IJ ink of the present embodiment may be appropriately set considering that it has an effect on the print suitability such as precipitation in an inkjet head. Specifically, the dispersion average particle size of the black iron oxide preferably has a median diameter D50 of 30 nm or greater and 1.0 μm or less, more preferably 30 nm or greater and 800 nm or less, and particularly preferably 100 nm or greater and 500 nm or less. When the particle size of the black iron oxide as a pigment is smaller than 30 nm, the dispersion stability may decrease, and when the particle size of the black iron oxide is larger than 1.0 μm, the print suitability (ejection performance, intermittent resumability) may decrease due to precipitation of the black iron oxide or the like. The dispersion average particle size of the black iron oxide may be determined using, for example, a laser diffraction method.

The content of the black iron oxide applied to the IJ ink of the present embodiment may be appropriately set considering the effects on the storage ability, viscosity, print density, and the like. Specifically, the content of the black iron oxide is preferably 1 mass % or greater and 40 mass % or less of a total mass of the composition, and more preferably 1 mass % or greater and 25 mass % or less. When the content of the black iron oxide is less than 1 mass %, the pigment composition or the like has decreased color development properties, and when the content of the black iron oxide is greater than 40 mass %, the pigment composition or the like has increased viscosity, which may lower the print suitability.

(Dispersion Medium)

In the present embodiment, a single dispersion medium or a plurality of dispersion media can be used as long as the dispersion medium can disperse black iron oxide and dissolve reduced isomaltulose. Examples of the dispersion medium used in the present embodiment include an edible alcohol such as ethanol or IPA (isopropyl alcohol), and a dispersion medium containing water can be preferably used. The water may be, for example, purified water or ion exchanged water.

(Dispersant)

Examples of the dispersant used in the present embodiment include those having relatively small molecular weight and relatively low viscosity, such as polyvinyl alcohol-acrylic acid-methyl methacrylate copolymer, aminoalkyl methacrylate copolymer, hydroxypropyl cellulose, polyvinyl pyrrolidone, hydroxypropyl methyl cellulose, polyvinyl alcohol-polyethylene glycol graft copolymer, ethyl acrylate-methyl methacrylate copolymer dispersion liquid, sucrose fatty acid ester, lecithin, Eudragit and the like.

These dispersants are edible and have good stability in the aqueous system, and contribute to dispersion stability of black iron oxide in the ink.

The compound ratio of the dispersant varies depending on the type of the dispersant, but usually is preferably 0.1 parts by mass or greater and 20 parts by mass or less per 1 part by mass of the black iron oxide pigment, and more preferably 0.5 parts by mass or greater and 10 parts by mass or less. When the compound ratio of the dispersant is less than 0.1 parts by mass, the dispersion stability decreases, and when the compound ratio of the dispersant is greater than 20 parts by mass, the viscosity of pigment composition increases, which may lower the print suitability.

(Oxidation Inhibitor)

The oxidation inhibitor used in the present embodiment is reduced isomaltulose. The amount of the reduced isomaltulose added is preferably 0.1 mass % or greater and 40 mass % or less of a total mass of the composition, more preferably 1 mass % or greater and 20 mass % or less, and particularly preferably 3 mass % or greater and 10 mass % or less. When the amount of the oxidation inhibitor added is less than 0.1 mass %, the oxidation inhibition effect decreases, and when the additive amount of the oxidation inhibitor is greater than 40 mass %, the oxidation inhibitor may not dissolve in the dispersion medium, or the pigment composition has increased viscosity, which may lower the print suitability.

[Printing Method]

The IJ ink using the pigment composition according to the present embodiment is suitable for a wide range of applications since it can be applied to commercially available inkjet apparatuses, and is very useful. In the examples described below, drop-on-demand inkjet printing, in which a piezo element (piezoelectric ceramic) is used as an actuator, will be explained as an example, but the printing method is not limited thereto. For example, other examples of the drop-on-demand inkjet printing include a thermal inkjet type in which the IJ ink is ejected using water vapor pressure generated by instantaneously heating micro heating elements to a high temperature (200° C. to 300° C.), an electrostatic type in which the IJ ink is ejected by electrostatically vibrating an actuator, and an ultrasonic type which uses an ultrasonic cavitation phenomenon. In addition, a continuous injection type (continuous type) can also be used when the IJ ink can be electrically charged.

[Target Tablets]

According to the IJ ink using the pigment composition of the present embodiment, the quality of a printed image formed on a surface of pharmaceutical tablets or pharmaceutical capsules by inkjet printing can be improved. Examples of the "pharmaceutical tablets" herein include film-coated tablets having an outermost surface on which a water-soluble surface layer is formed, as well as uncoated tablets (bare tablets), sugar-coated tablets, enteric tablets, and orally disintegrating tablets. Further, examples of the "pharmaceutical capsules" include hard capsules and soft capsules. The hard capsules and soft capsules may be composed of, for example, a tubular body and a cap. The body made of gelatin or a plant-derived material is filled with a content, which is mainly powder or granules, directly or as a mixture with a plurality of powder materials, and closed with the cap.

The following description will be given of a configuration of a pharmaceutical tablet having a printed image (print portion) printed with the IJ ink using the pigment composition according to the embodiment.

Figure 1A:
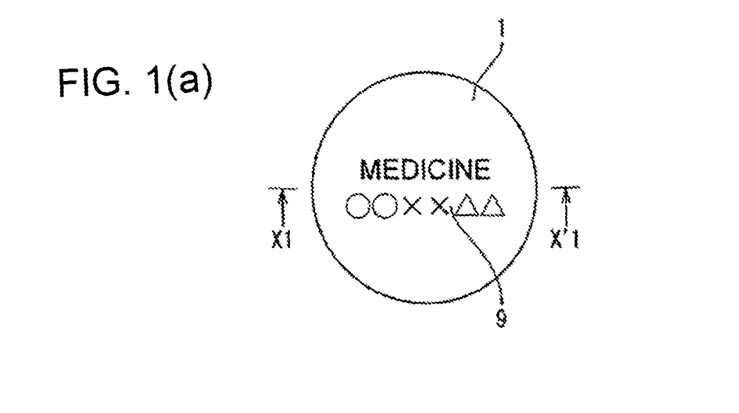
FIG. 1(a) and FIG. 1(b) includes a plan view and a cross-sectional view illustrating a first configuration example of a pharmaceutical tablet according to the present embodiment.
Figure 1B:
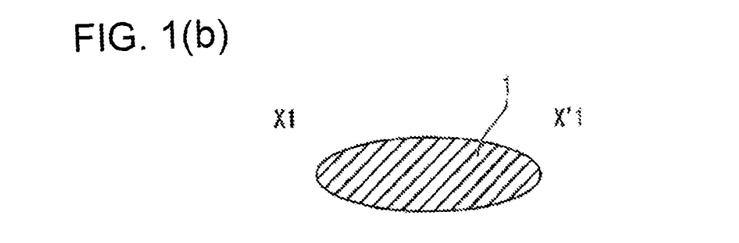

FIGS. 1(a) and 1(b) are a plan view illustrating a first configuration example of a pharmaceutical tablet according to the present embodiment and a cross-sectional view taken along the line X1-X'1 in the plan view, respectively. The pharmaceutical tablet illustrated in FIGS. 1(a) and 1(b) is an uncoated tablet, and an image 9 is printed on a surface of a tablet matrix 1. The image 9 may be any image including characters, symbols, barcodes, or the like, which is printed by inkjet printing with the IJ ink using the pigment composition of the present embodiment.

Figure 2A:
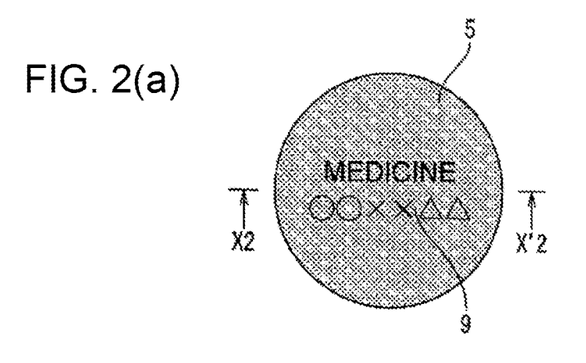
FIG. 2(a) and FIG. 2(b) includes a plan view and a cross-sectional view illustrating a second configuration example of a pharmaceutical tablet according to the present embodiment.
Figure 2B:
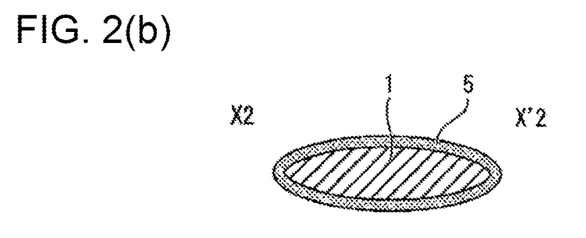

FIGS. 2(a) and 2(b) are a plan view illustrating a second configuration example of a pharmaceutical tablet according to the present embodiment and a cross-sectional view taken along the line X2-X'2 in the plan view, respectively. The pharmaceutical tablet illustrated in FIGS. 2(a) and 2(b) is a film-coated tablet, and the image 9 is printed on a surface of a film 5 coating the tablet matrix 5. As with the image 9 illustrated in FIGS. 1(a) and (b), the image 9 illustrated in FIGS. 2(a) and 2(b) is printed by inkjet printing with the IJ ink using the pigment composition of the present embodiment.

There is no particular limitation on the active ingredients contained in the pharmaceutical tablets. Examples of the active ingredients include, but are not limited to, substances effective for preventing or treating various diseases (e.g., substances having sleep-inducing effect, tranquilizer activity, antibacterial activity, antihypertensive effect, anti-angina activity, analgesic effect, anti-inflammatory activity, tranquilizing effect, diabetes treatment activity, diuretic effect, anticholinergic activity, anti-hyperacidity effect, antiepileptic effect, ACE inhibitory activity, β-receptor antagonist or agonist activity, anesthetic effect, appetite suppressant effect, antiarrhythmic effect, antidepressant effect, anticoagulant activity, antidiarrheal effect, antihistamine activity, antimalarial effect, antitumor activity, immunosuppressive activity, antiparkinsonian effect, antipsychotic effect, antiplatelet activity, antihyperlipidemic effect, and the like), substances having scavenging effect, fragrances, and substances having a deodorant effect.

In the tablet according to the present embodiment, carriers acceptable for the applications may be formulated as necessary together with active ingredients. For example, pharmaceutically acceptable carriers may be formulated in pharmaceutical tablets. Various organic or inorganic carriers that are commonly used as formulation materials can be used as the pharmaceutically acceptable carriers. For example, an appropriate amount of excipient, lubricant, binder, disintegrant, thickener, or the like may be appropriately formulated. As necessary, additives such as a preservative, an antioxidant, a coloring agent, and a sweetening agent may also be used.

In the present embodiment, a pharmaceutical tablet has been described as an example of the tablet, but the present invention is not limited thereto. There is no particular limitation on the targets to be printed on with the IJ ink using the pigment composition according to the present embodiment. For example, the IJ ink may be printed on the surface of various tablets, including feed tablets, fertilizer tablets, cleaning agent tablets, and food tablets such as lemonade flavored confectionery. Also, there is no particular limitation on the size of the targets to be printed on with the IJ ink using the pigment composition according to the present embodiment. The IJ ink can be applied to tablets of various sizes.

Moreover, the IJ ink using the pigment composition according to the present embodiment may also be applied to direct printing onto food products or packages in direct contact with pharmaceutical products or food products in addition to the direct printing onto the surface of tablets described above.

(Effects of Present Embodiment)

(1) A pigment composition according to the present embodiment includes: a black iron oxide; a dispersion medium; a dispersant; and an oxidation inhibitor, wherein the black iron oxide has a median diameter D50 of 30 nm or greater and 1 μm or less, the dispersion medium contains water, and the oxidation inhibitor is reduced isomaltulose.

With this configuration, even when the pigment contained in ink or the like has a small particle size such as a nanometer size, it is possible to better prevent oxidation of the pigment from occurring in the ink or after printing, and reduce discoloration of the pigment.

(2) Further, a content of the oxidation inhibitor in the pigment composition according to the present embodiment may be 0.1 mass % or greater and 40 mass % or less of a total mass of the composition.

With this configuration, it is possible to better prevent oxidation of the pigment from occurring in the ink or after printing, and reduce discoloration of the pigment.

(3) Further, a content of the black iron oxide in the pigment composition according to the present embodiment may be 1 mass % or greater and 40 mass % or less of a total mass of the composition.

With this configuration, the color development properties of the ink can be improved.

(4) Further, the pigment composition according to the present embodiment may be used for a water-based pigment inkjet dispersion liquid.

With this configuration, it is possible to reduce change in color tone of the water-based pigment inkjet dispersion liquid.

(5) Further, the pigment composition according to the present embodiment may be used for a water-based pigment inkjet ink.

With this configuration, it is possible to reduce change in color tone of the water-based pigment inkjet ink.

(6) Further, the pigment composition according to the present embodiment may be used for edible IJ ink which is used for direct printing onto a tablet surface, a soft capsule surface, or a hard capsule surface, or direct printing onto a food product.

With this configuration, the pigment composition can be used for direct printing onto a surface of tablets or the like or direct printing onto food products, and can also be used for packages in direct contact with pharmaceutical products or food products.

(7) Further, a tablet according to the present embodiment includes a print portion (printed image) printed with the IJ ink containing the pigment composition described above.

With this configuration, it is possible to reduce change in color tone of the print portion (printed image) printed on the tablet surface.

(8) Further, a capsule according to the present embodiment includes a print portion (printed image) printed with the IJ ink containing the pigment composition described above.

With this configuration, it is possible to reduce change in color tone of the print portion (printed image) printed on the capsule surface.

(9) Further, the tablet according to the present embodiment may be a pharmaceutical tablet.

With this configuration, it is possible to reduce change in color tone of the printed image printed on a surface of the pharmaceutical tablet.

(10) Further, the capsule according to the present embodiment may be a pharmaceutical capsule.

With this configuration, it is possible to reduce change in color tone of the printed image printed on a surface of the pharmaceutical capsule.

EXAMPLES

The present invention will be described in more detail below by way of examples, but the present invention is not limited in any way to the examples.

(Production of IJ Ink Using Pigment Composition)

The following description will be given of a procedure for preparing an IJ ink using a pigment composition.

First, an IJ ink using a pigment composition was prepared. The ink according to the present example includes a black iron oxide, water as a dispersion medium, a dispersant, and an oxidation inhibitor.

The following description will be given of steps in preparation of the ink.

First, a dispersant and a black iron oxide were added to water. A mixed solution containing the water, the dispersant and the black iron oxide was introduced into a paint shaker of a disperser, and then refined and dispersed for 1 to 3 hours to prepare a dispersion liquid. The dispersion liquid is also called a "water-based pigment inkjet dispersion liquid using a pigment composition" or an "inkjet dispersion liquid."

Then, the dispersion liquid using the pigment composition was dispersed in a solvent, which was an organic solvent, to prepare ink. A content of the pigment composition was 50 mass % of a total mass of the ink.

The water used for the ink was ion exchanged water, and the organic solvent was a drying solvent using ethanol and 2-propanol. A median diameter of the black iron oxide was measured using a laser diffraction particle size distribution analyzer (LA-960 manufactured by HORIBA, Ltd.).

Thus, the ink with 39 types of pigment compositions, each having a component different from the other, was prepared. Table 1 shows the components.

Then, the 39 types of ink having different components were filtered with a membrane filter to remove solid foreign matter in the liquid. Specifically, each ink was filtered once with a membrane filter (cellulose acetate film) having a pore size of 5.0 μm, and then filtered once with a membrane filter (cellulose acetate film) having a pore size of 0.8 μm to obtain a refined ink.

TABLE 1

| | Description of formulation | | | | | |
|---|---|---|---|---|---|---|
| | Pigment | | | | | |
| Sample No. | Pigment species | Dispersant | Median diameter D50 | Pigment concentration (mass %) | Solvent (dispersion medium) | Oxidation inhibitor (mass %) |
| Comparative example 1 | Black iron oxide | CMC-Na | 30 nm | 7.0% | Water | — |
| Comparative example 2 | Black iron oxide | CMC-Na | 180 nm | 7.0% | Water | — |
| Comparative example 3 | Black iron oxide | CMC-Na | 350 nm | 7.0% | Water | — |
| Comparative example 4 | Black iron oxide | CMC-Na | 500 nm | 7.0% | Water | — |
| Comparative example 5 | Black iron oxide | CMC-Na | 850 nm | 7.0% | Water | — |
| Comparative example 6 | Black iron oxide | CMC-Na | 1 μm | 7.0% | Water | — |
| Comparative example 7 | Black iron oxide | CMC-Na | 1.2 μm | 7.0% | Water | — |
| Comparative example 8 | Black iron oxide | CMC-Na | 1.2 μm | 7.0% | Water | Reduced isomaltulose 5% |
| Comparative example 9 | Black iron oxide | CMC-Na | 20 nm | 7.0% | Water | — |
| Comparative example 10 | Black iron oxide | CMC-Na | 180 nm | 7.0% | Water | Trehalose 5% |
| Comparative example 11 | Black iron oxide | CMC-Na | 180 nm | 7.0% | Water | Maltodextrin 5% |
| Comparative example 12 | Black iron oxide | CMC-Na | 180 nm | 7.0% | Water | Erythritol 5% |
| Example 1 | Black iron oxide | CMC-Na | 30 nm | 7.0% | Water | Reduced isomaltulose 5% |
| Example 2 | Black iron oxide | CMC-Na | 180 nm | 7.0% | Water | Reduced isomaltulose 5% |
| Example 3 | Black iron oxide | Sucrose fatty acid ester | 180 nm | 7.0% | Water | Reduced isomaltulose 5% |
| Example 4 | Black iron oxide | CMC-Na | 180 nm | 7.0% | Water/ethanol (1:1) | Reduced isomaltulose 5% |

TABLE 1-continued

| | | | | | | |
|---|---|---|---|---|---|---|
| Example 5 | Black iron oxide | CMC-Na | 180 nm | 7.0% | Water/IPA (1:1) | Reduced isomaltulose 5% |
| Example 6 | Black iron oxide | CMC-Na | 350 nm | 7.0% | Water | Reduced isomaltulose 5% |
| Example 7 | Black iron oxide | CMC-Na | 500 nm | 7.0% | Water | Reduced isomaltulose 5% |
| Example 8 | Black iron oxide | CMC-Na | 850 nm | 7.0% | Water | Reduced isomaltulose 5% |
| Example 9 | Black iron oxide | CMC-Na | 1 μm | 7.0% | Water | Reduced isomaltulose 5% |
| Example 10 | Black iron oxide | CMC-Na | 180 nm | 7.0% | Water | Reduced isomaltulose 0.1% |
| Example 11 | Black iron oxide | CMC-Na | 350 nm | 7.0% | Water | Reduced isomaltulose 1% |
| Example 12 | Black iron oxide | CMC-Na | 180 nm | 7.0% | Water | Reduced isomaltulose 10% |
| Example 13 | Black iron oxide | CMC-Na | 180 nm | 7.0% | Water | Reduced isomaltulose 15% |
| Example 14 | Black iron oxide | CMC-Na | 180 nm | 7.0% | Water | Reduced isomaltulose 20% |
| Example 15 | Black iron oxide | CMC-Na | 180 nm | 7.0% | Water | Reduced isomaltulose 30% |
| Example 16 | Black iron oxide | CMC-Na | 180 nm | 7.0% | Water | Reduced isomaltulose 40% |
| Example 17 | Black iron oxide | CMC-Na | 350 nm | 0.5% | Water | Reduced isomaltulose 5% |
| Example 18 | Black iron oxide | CMC-Na | 180 nm | 1.0% | Water | Reduced isomaltulose 5% |
| Example 19 | Black iron oxide | CMC-Na | 180 nm | 10.0% | Water | Reduced isomaltulose 5% |
| Example 20 | Black iron oxide | CMC-Na | 180 nm | 15.0% | Water | Reduced isomaltulose 5% |
| Example 21 | Black iron oxide | CMC-Na | 180 nm | 20.0% | Water | Reduced isomaltulose 5% |
| Example 22 | Black iron oxide | CMC-Na | 180 nm | 30.0% | Water | Reduced isomaltulose 5% |
| Example 23 | Black iron oxide | CMC-Na | 180 nm | 40.0% | Water | Reduced isomaltulose 5% |
| Example 24 | Black iron oxide | CMC-Na | 180 nm | 45.0% | Water | Reduced isomaltulose 5% |
| Example 25 | Black iron oxide | CMC-Na | 180 nm | 45.0% | Water | Reduced isomaltulose 45% |
| Example 26 | Black iron oxide | CMC-Na | 350 nm | 45.0% | Water | Reduced isomaltulose 5% |
| Example 27 | Black iron oxide | CMC-Na | 350 nm | 10.0% | Water | Reduced isomaltulose 45% |

| | Description of formulation | | | | |
|---|---|---|---|---|---|
| | Print suitability | | Evaluation result of change in color of print | | |
| Sample No. | Ejection performance | Print resumability | Uncoated tablet | FC tablet | Evaluation result |
| Comparative example 1 | Good | Excellent | ΔE = 10.2 | ΔE = 9.0 | — |

TABLE 1-continued

| | | | | | |
|---|---|---|---|---|---|
| Comparative example 2 | Good | Excellent | ΔE = 8.0 | ΔE = 7.0 | — |
| Comparative example 3 | Good | Excellent | ΔE = 6.1 | ΔE = 5.3 | — |
| Comparative example 4 | Good | Good | ΔE = 4.3 | ΔE = 4.0 | — |
| Comparative example 5 | Good | Good | ΔE = 3.5 | ΔE = 3.1 | — |
| Comparative example 6 | Good | Good | ΔE = 2.8 | ΔE = 2.5 | — |
| Comparative example 7 | Poor | Poor | ΔE = 1.5 | ΔE = 1.0 | — |
| Comparative example 8 | Poor | Poor | ΔE = 0.6 | ΔE = 0.4 | Poor (vs. Comparative example 7) |
| Comparative example 9 | — | — | No pigment dispersed | No pigment dispersed | — |
| Comparative example 10 | Good | Excellent | ΔE = 8.0 | ΔE = 7.4 | Poor (vs. Comparative example 2) |
| Comparative example 11 | Good | Excellent | ΔE = 7.8 | ΔE = 7.1 | Poor (vs. Comparative example 2) |
| Comparative example 12 | Good | Excellent | ΔE = 8.3 | ΔE = 7.4 | Poor (vs. Comparative example 2) |
| Example 1 | Good | Excellent | ΔE = 8.1 | ΔE = 6.7 | Good (vs. Comparative example 1) |
| Example 2 | Good | Excellent | ΔE = 5.5 | ΔE = 4.9 | Good (vs. Comparative example 2) |
| Example 3 | Good | Good | ΔE = 5.9 | ΔE = 4.6 | Good (vs. Comparative example 2) |
| Example 4 | Good | Good | ΔE = 5.6 | ΔE = 4.5 | Good (vs. Comparative example 2) |
| Example 5 | Good | Good | ΔE = 5.6 | ΔE = 4.5 | Good (vs. Comparative example 2) |
| Example 6 | Good | Excellent | ΔE = 2.8 | ΔE = 3.2 | Good (vs. Comparative example 3) |
| Example 7 | Good | Good | ΔE = 2.1 | ΔE = 1.5 | Good (vs. Comparative example 4) |
| Example 8 | Good | Good | ΔE = 1.2 | ΔE = 0.7 | Good (vs. Comparative example 5) |
| Example 9 | Good | Good | ΔE = 0.8 | ΔE = 0.4 | Good (vs. Comparative example 6) |
| Example 10 | Good | Excellent | ΔE = 5.5 | ΔE = 4.5 | Good (vs. Comparative example 2) |
| Example 11 | Good | Excellent | ΔE = 3.2 | ΔE = 3.2 | Good (vs. Comparative example 3) |
| Example 12 | Good | Excellent | ΔE = 4.2 | ΔE = 4.6 | Good (vs. Comparative example 2) |
| Example 13 | Good | Excellent | ΔE = 4.0 | ΔE = 4.0 | Good (vs. Comparative example 2) |
| Example 14 | Good | Excellent | ΔE = 3.8 | ΔE = 3.5 | Good (vs. Comparative example 2) |
| Example 15 | Good | Good | ΔE = 2.6 | ΔE = 2.8 | Good (vs. Comparative example 2) |
| Example 16 | Good | Good | ΔE = 2.5 | ΔE = 2.2 | Good (vs. Comparative example 2) |
| Example 17 | Good | Excellent | ΔE = 3.0 | ΔE = 2.7 | Good (vs. Comparative example 3) |
| Example 18 | Good | Excellent | ΔE = 4.5 | ΔE = 4.0 | Good (vs. Comparative example 2) |

TABLE 1-continued

| | | | | | |
|---|---|---|---|---|---|
| Example 19 | Good | Good | ΔE = 4.8 | ΔE = 5.0 | Good (vs. Comparative example 2) |
| Example 20 | Good | Good | ΔE = 4.0 | ΔE = 4.0 | Good (vs. Comparative example 2) |
| Example 21 | Good | Good | ΔE = 3.8 | ΔE = 3.9 | Good (vs. Comparative example 2) |
| Example 22 | Good | Good | ΔE = 3.5 | ΔE = 3.5 | Good (vs. Comparative example 2) |
| Example 23 | Good | Good | ΔE = 3.2 | ΔE = 3.1 | Good (vs. Comparative example 2) |
| Example 24 | Good | Good | ΔE = 3.0 | ΔE = 2.8 | Good (vs. Comparative example 2) |
| Example 25 | Good | Good | ΔE = 3.2 | ΔE = 2.5 | Good (vs. Comparative example 2) |
| Example 26 | Good | Good | ΔE = 3.1 | ΔE = 1.8 | Good (vs. Comparative example 3) |
| Example 27 | Good | Excellent | ΔE = 2.1 | ΔE = 1.3 | Good (vs. Comparative example 3) |

In the present example, evaluations of print resumability, ejection performance, and change in color of a print were performed for the pigment compositions of Examples 1 to 27 and Comparative Examples 1 to 12. Table 1 shows the evaluation results. In the "oxidation inhibitor" column in Table 1, "-" means that no oxidation inhibitor was added. The evaluation method in the present example is as follows.

(1) Evaluation of Print Resumability

A drop-on-demand inkjet head driven by piezoelectric ceramic was used, which had 600 dpi print resolution in a main scan direction, 600 dpi print resolution in a sub scan direction (transport direction of a recording medium such as a tablet) and 2,656 nozzles in total. After the inkjet head was left for a predetermined time (15 minutes to 60 minutes) without flushing, ejection was performed at a 6 pl-print drop size per drop to print a test pattern. Thus, it was checked whether all the nozzles could eject without insufficient ejection. In Table 1, as the evaluation result of the print resumability, a period of time after which the ink can be ejected was measured. The evaluation criteria are as follows.

Excellent: 30 min. or more and less than 60 min.
Good: 15 min. or more and less than 30 min.
Poor: Less than 15 min.

The print resumability (intermittent resumability) is "excellent" or "good" in Examples 1 to 27, whereas the print resumability (intermittent resumability) is "poor" in Comparative Examples 7 and 8.

Further, the print resumability (intermittent resumability) in Comparative Example 9 was unmeasurable, and is indicated by "-".

(2) Evaluation of Ejection Performance

A drop-on-demand inkjet head driven by piezoelectric ceramic was used, which had 600 dpi print resolution in a main scan direction, 600 dpi print resolution in a sub scan direction (transport direction of a recording medium such as a tablet) and 2,656 nozzles in total. After the inkjet head continuously performed printing operation for a predetermined time (30 minutes), ejection was performed at a 6 pl-print drop size per drop to print a test pattern. Thus, it was checked whether all the nozzles could eject without insufficient ejection. In Table 1, as the evaluation result of the ejection performance, whether the ink can be ejected after the printing operation performed for 30 minutes was checked. The evaluation criteria are as follows.

Good: Ink can be ejected after 30-minute printing operation.
Poor: Ink cannot be ejected after 30-minute printing operation.

The ejection performance was "good" in all of Examples 1 to 27, whereas the ejection performance is "poor" in Comparative Examples 7 and 8.

Further, the ejection performance in Comparative Example 9 was unmeasurable, and is indicated by "-".

(3) Evaluation of Change in Color of Print

The above-mentioned refined ink was used to print a circular solid image (diameter: 4.0 mm) using a printer with a bending mode piezoelectric inkjet head. The test image was printed on a test uncoated tablet (tablet matrix: modified starch) and a film-coated (FC) tablet (tablet matrix: modified starch, coating agent: a mixture of 70% hydroxypropyl methylcellulose and 30% titanium oxide, diameter: 6.5 mm).

A spectrodensitometer "X-Rite 530" manufactured by X-Rite Inc. was placed over a top face of the solid image printed on the uncoated tablet and the film-coated tablet to measure the color tone (L*a*b* color system). The conditions for the measurement were set at a 2 degree viewing angle and a D50 light source.

After the chromaticity and the optical color density of each print on the uncoated tablet and the film-coated tablet were measured, the uncoated tablet and the film-coated tablet were kept under the environment of 23±2° C. and 65±5% RH for 3 months using a constant temperature and humidity chamber (IG421, manufactured by Yamato Scientific Co., Ltd.). Then, change in color tone before and after the test was measured.

A comparison was performed between the pigments having the same particle size with an oxidation inhibitor being added to one and not to the other to determine a difference in color tone (discoloration suppression) therebetween. When the difference was ΔE≥2, it was determined that there was an oxidation suppression effect. The evaluation criteria are as follows.

Good: Difference in color tone (discoloration suppression) observed

Poor: No difference in color tone (discoloration suppression) observed

The following description specifically explains using a case where the black iron oxide as a pigment has a median diameter D50 of 30 nm.

In both Comparative Example 1 and Example 1, the median diameter D50 of the black iron oxide was 30 nm. The value of ΔE of the uncoated tablet of Comparative Example 1 was compared with the value of ΔE of the uncoated tablet of Example 1 to calculate the difference therebetween. Also, the value of ΔE of the FC tablet of Comparative Example 1 was compared with the value of ΔE of the FC tablet of Example 1 to calculate the difference therebetween. The values thus calculated were 2 or greater. This indicates that the effect of adding the oxidation inhibitor has been achieved, and the evaluation of change in color tone of a print is rated as "good."

Next, a case where the black iron oxide as a pigment has a median diameter D50 of 180 nm will be described.

In both Comparative Example 2 and Comparative Example 10, the median diameter D50 of the black iron oxide was 180 nm. The value of ΔE of the uncoated tablet of Comparative Example 2 was compared with the value of ΔE of the uncoated tablet of Comparative Example 10 to calculate the difference therebetween. Also, the value of ΔE of the FC tablet of Comparative Example 1 was compared with the value of ΔE of the FC tablet of Comparative Example 10 to calculate the difference therebetween. The values thus calculated were less than 2. This indicates that the effect of adding the oxidation inhibitor has not been achieved, and the evaluation of change in color tone of a print is rated as "poor."

As described above, the evaluation of oxidation suppression effect was performed for Comparative Examples 7 to 12 and Examples 1 to 27 by using the change in color of a print in Comparative Examples 1 to 6 as a reference for each median diameter D50 particle size. The results are shown in Table 1. In the evaluation results of the change in color of a print, the comparative examples used as the reference are indicated by "-".

The result of discoloration suppression effect was "good" in all of Examples 1 to 27, whereas the result of discoloration suppression effect is "poor" in Comparative Examples 8 and 10 to 12.

The above result shows that, when the pigment composition includes a black iron oxide, a dispersion medium, a dispersant, and an oxidation inhibitor, wherein the black iron oxide has a median diameter D50 of 30 nm or greater and 1 μm or less, and the oxidation inhibitor is reduced isomaltulose, it is possible to better prevent oxidation of the pigment from occurring in the ink or after printing, and reduce discoloration of the pigment, even when the pigment contained in the ink or the like has a small particle size such as a nanometer size.

[Reference Signs List] 1 Tablet matrix; 5 Film; 9 Image.

What is claimed is:

1. A pigment composition comprising:
   1 mass % to 25 mass % of a black iron oxide;
   40 mass % to 50 mass % of water;
   a CMC-Na dispersant in an amount of 0.5 to parts per 1 part by mass of the black iron oxide; and
   3 mass % to 10 mass % of an oxidation inhibitor, wherein
   the black iron oxide has a median diameter D50 of 30 nm or greater and 1 μm or less,
   the dispersion medium contains water, and
   the oxidation inhibitor is reduced isomaltulose.

2. The pigment composition of claim 1, wherein the pigment composition is a water-based pigment inkjet dispersion liquid.

3. The pigment composition of claim 1, wherein the pigment composition is a water-based pigment inkjet ink.

4. The pigment composition of claim 1, wherein the pigment composition is an edible inkjet ink for direct printing onto a tablet surface, a soft capsule surface, or a hard capsule surface, or direct printing onto a food product.

5. A tablet comprising a print portion printed with inkjet ink containing the pigment composition of claim 4.

6. A capsule comprising a print portion printed with inkjet ink containing the pigment composition of claim 4.

7. The tablet of claim 5, wherein the tablet is a pharmaceutical tablet.

8. The capsule of claim 6, wherein the capsule is a pharmaceutical capsule.

* * * * *